Sept. 18, 1951  T. Z. HERR  2,568,069
CARD TRANSFER MECHANISM
Filed April 16, 1948  9 Sheets-Sheet 1

INVENTOR
THEODORE Z. HERR
BY Hyde, Meyer, Baldwin & Doran
ATTORNEYS

Sept. 18, 1951     T. Z. HERR     2,568,069
CARD TRANSFER MECHANISM

Filed April 16, 1948     9 Sheets-Sheet 2

*INVENTOR.*
THEODORE Z. HERR

BY

*Hyde, Meyer, Baldwin & Doran*

ATTORNEYS

Sept. 18, 1951  T. Z. HERR  2,568,069
CARD TRANSFER MECHANISM
Filed April 16, 1948  9 Sheets-Sheet 3

INVENTOR
THEODORE Z. HERR
BY Hyde, Meyer, Baldwin & Doran
ATTORNEYS

Sept. 18, 1951     T. Z. HERR     2,568,069

CARD TRANSFER MECHANISM

Filed April 16, 1948     9 Sheets-Sheet 4

INVENTOR.
THEODORE Z. HERR

BY
ATTORNEYS

Sept. 18, 1951      T. Z. HERR      2,568,069
CARD TRANSFER MECHANISM.
Filed April 16, 1948      9 Sheets-Sheet 5

*INVENTOR.*
THEODORE Z. HERR
BY
*Hyde, Meyer, Baldwin & Doran*
ATTORNEYS

Sept. 18, 1951     T. Z. HERR     2,568,069
CARD TRANSFER MECHANISM

Filed April 16, 1948     9 Sheets-Sheet 6

*INVENTOR.*
THEODORE Z. HERR
BY
ATTORNEYS

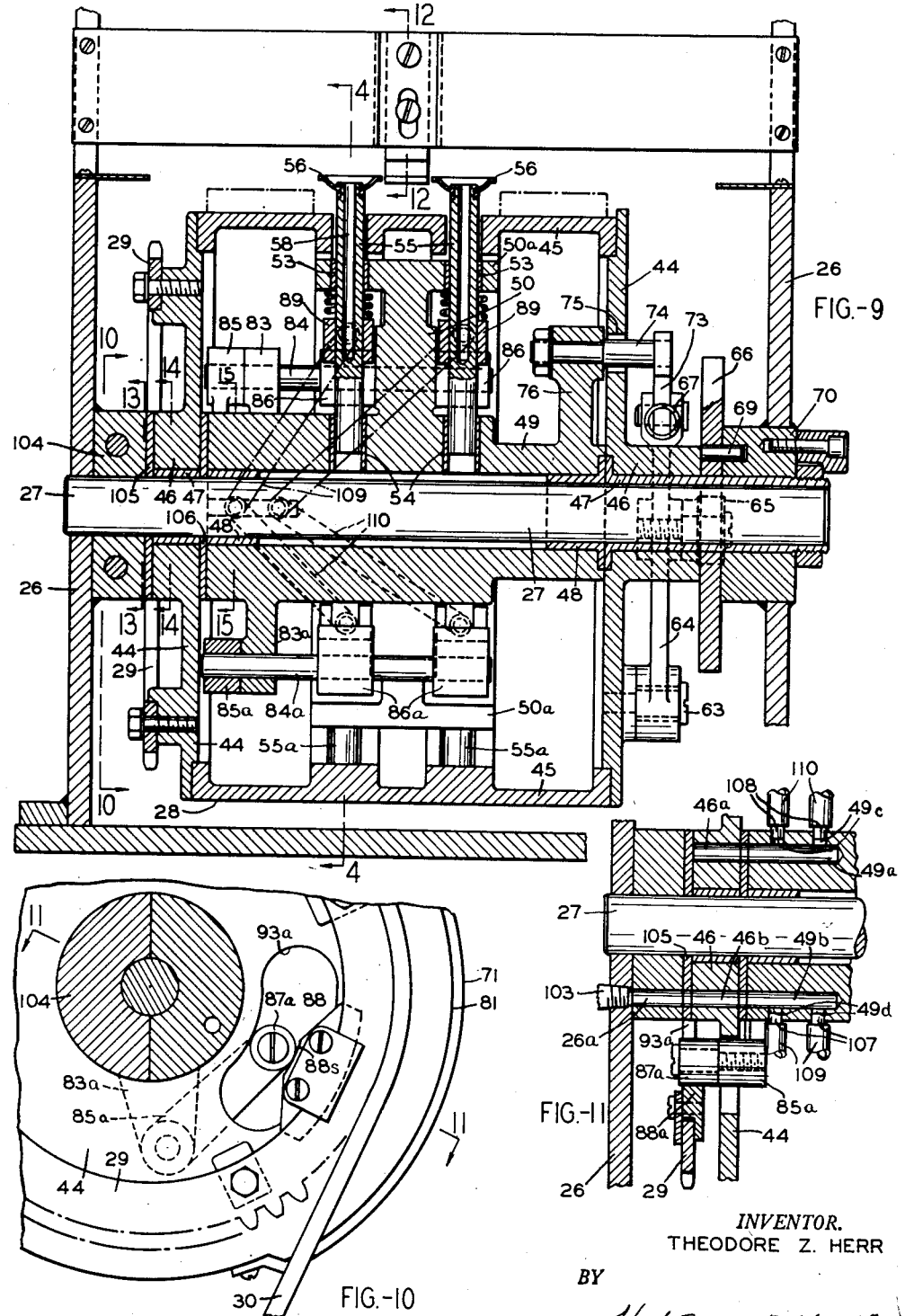

Sept. 18, 1951  T. Z. HERR  2,568,069
CARD TRANSFER MECHANISM
Filed April 16, 1948  9 Sheets-Sheet 8

INVENTOR.
THEODORE Z. HERR
BY
Hyde, Meyer, Baldwin & Doran
ATTORNEYS

Sept. 18, 1951   T. Z. HERR   2,568,069
CARD TRANSFER MECHANISM
Filed April 16, 1948   9 Sheets-Sheet 9

INVENTOR
THEODORE Z. HERR
BY Hyde, Meyer, Baldwin & Doran
ATTORNEYS

Patented Sept. 18, 1951

2,568,069

UNITED STATES PATENT OFFICE 2,568,069

CARD TRANSFER MECHANISM

Theodore Z. Herr, Lancaster, Pa., assignor to American Greeting Publishers, Inc., Cleveland, Ohio, a corporation of Ohio Application April 16, 1948, Serial No. 21,452

7 Claims. (Cl. 271—29)

1

This invention relates to novel and improved sheet pickup and transfer mechanism adapted to receive a stack of sheets, cards, or the like, and to deliver them one by one at predetermined intervals to a container, conveyor, or otherwise as desired. For convenience in description herein, the item to be handled will be termed a card, although it will be obvious as the description proceeds that the apparatus is suitable for the selection and transfer of any item of sheet-like character. In one commercial embodiment, to be described hereinafter, the mechanism is used to deliver predetermined numbers of greeting cards in sequence, for boxing in convenient lots.

An object of the invention is to provide novel and improved card pickup mechanism adapted to receive and transfer individual cards from a stack, but to automatically stop the mechanism and give a visible or audible indication of trouble if no card is transferred, or if more than one card is transferred in one operation.

A further object of the invention is to provide novel and improved vacuum pickup means adapted to automatically advance to operative contact with a card in a stack, thereafter withdraw the card and transfer it to a delivery zone, and then automatically release the card.

A further object is to provide, in a mechanism such as characterized in the last preceding paragraph, feeler means sensitive to card thickness, disposed between the card pickup and delivery zones in the path of card travel, and effective upon the said mechanism to stop its operation if the card or other moving object intercepting the feeler mechanism is not of pre-established thickness, or if no card intercepts the feeler means at the proper predetermined instant in the operational cycle.

A further object of the invention is to provide card transfer means including a drum having a portion rotatable past a stack of cards, card pickup means carried by said drum, means for causing rotation of said pickup means with said drum during an angular portion of drum travel, means for stopping rotation of said pickup means temporarily during drum rotation when said pickup means reaches alignment with said stack, means for producing radial outward displacement of said pickup means whereby to initiate holding contact between said pickup means and said card during temporary stoppage of the pickup means as aforesaid, means for producing radial inward withdrawal of said pickup means after holding contact has been established as aforesaid whereby to initiate removal of said card from said stack,

2 means causing release of said card from said pickup means when said pickup means rotates to card delivery position, and means for restoring said pickup means to its original position circumferentially with respect to said drum surface so as to be ready for the next card pickup.

Other objects and advantages will be apparent from a study of the following description, in conjunction with the accompanying drawings, in which:

Fig. 9 is a sectional view taken on the line 9—9 of Fig. 4;

Fig. 10 is a sectional view taken on the line 10—10 of Fig. 9;

Fig. 11 is a sectional view taken on the line 11—11 of Fig. 10;

Figure 16:
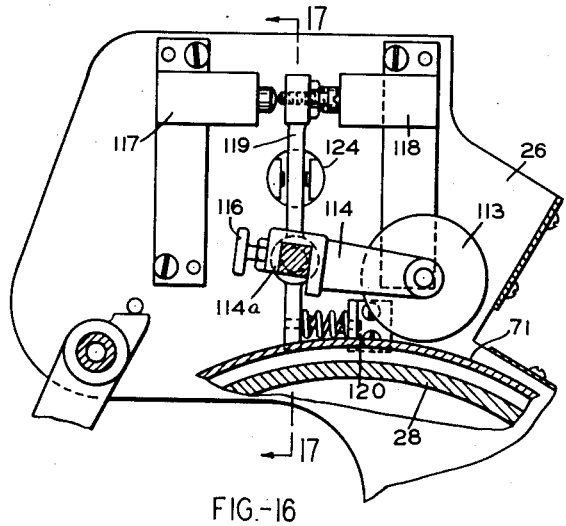
Figure 17:
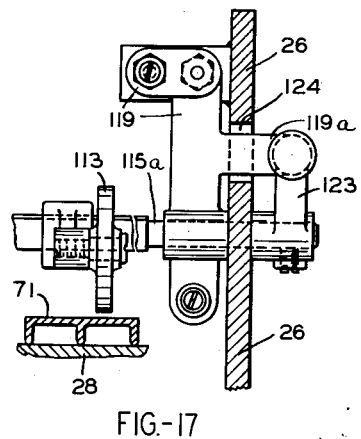
Figure 18:
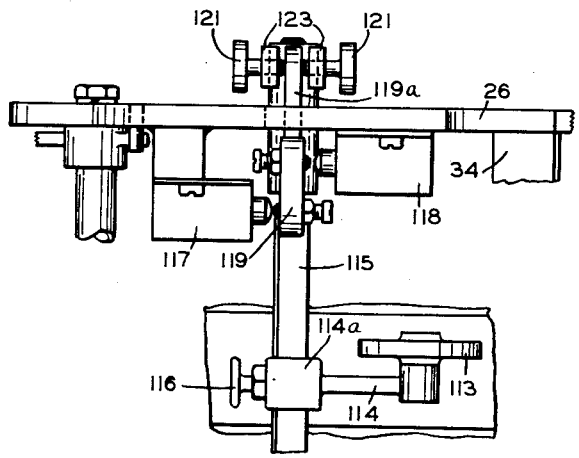
Figure 19:
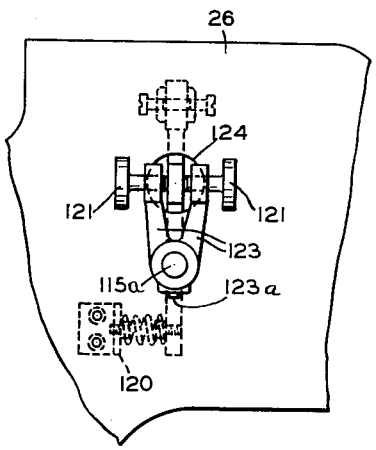
Figure 20:
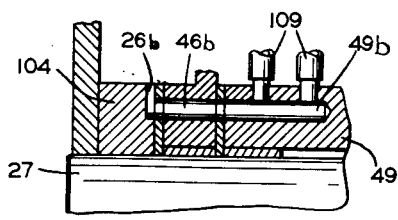
Figure 21:
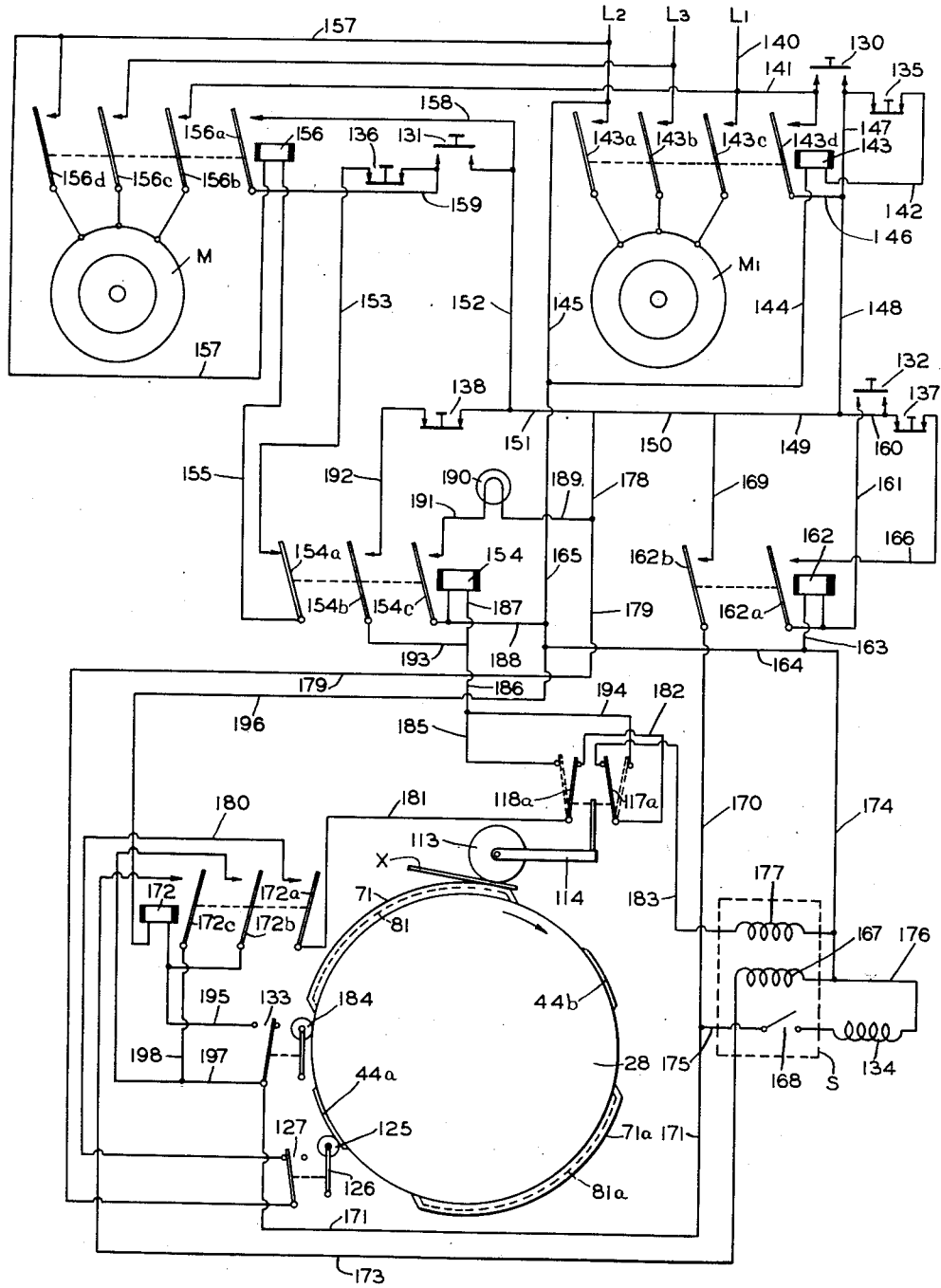

Figs. 12, 13, 14 and 15 are sectional views taken on the lines 12—12, 13—13, 14—14 and 15—15 of Fig. 9;

Fig. 16 is a fragmentary detail view of the feeler mechanism;

Fig. 17 is a sectional view taken on the lines 17—17 of Fig. 16;

Fig. 18 is a top plan view of the part shown in Fig. 16;

Fig. 19 is a side elevational view taken from the right of Fig. 17;

Fig. 20 is a fragmentary detail view, showing part of the air exhaust passageway, and the vent to atmosphere; while, Fig. 21 is a wiring diagram suitable for one embodiment of the invention.

The invention will be illustrated and described in connection with the drawings which show one embodiment of a mechanism adapted to receive a stack of greeting cards, and to deliver the cards individually in lots of twelve, or twenty-five, or any desired unit, suitable for wrapping or boxing. The mechanism is adapted to deliver either a suitable lot of identical cards from a single stack, or an assorted lot of cards, such as one from each of a plurality of stacks, each stack being different from the others.

Speaking first generally, the embodiment of the invention here shown comprises means for holding a stack of cards, and transfer means for picking a card from the stack and carrying it to a delivery point where it is dropped on an endless conveyor. The transfer means comprises a drum rotatable at constant speed on a shaft. Within the drum, and also mounted for rotation on the shaft, is a sleeve carried concentrically on the shaft. The sleeve and drum are operatively connected by a differential speed linkage later to be described which permits the sleeve at times to rotate at the same speed as the drum, and at other times to accelerate, decelerate, or even stop while the drum rotates at constant speed.

The outer peripheral wall of the drum is slotted, and the sleeve carries card pickup means adapted to extend radially outwardly through the slot. As will appear, the stack of cards is in suitable position to be adjacent to, and registrable with the slot at recurring points in the drum rotation, and the distinctive operation of the sleeve, by reason of the linkage above mentioned, permits the card pickup means to come to a complete though momentary stop when in alignment with the stack of cards. At this moment the card pickup means moves radially outwardly, grips a card, and withdraws sufficiently to initiate separation of a card from the stack. The pickup means then resumes rotation with the drum, and the card is carried around to a delivery zone, where it is released. The sleeve on which the pickup means is supported is thereafter accelerated to regain its original position with respect to the drum, so as to be in suitable position to pick up the next card.

The novel and improved means whereby the aforesaid operation is performed will now be described.

Figure 1:
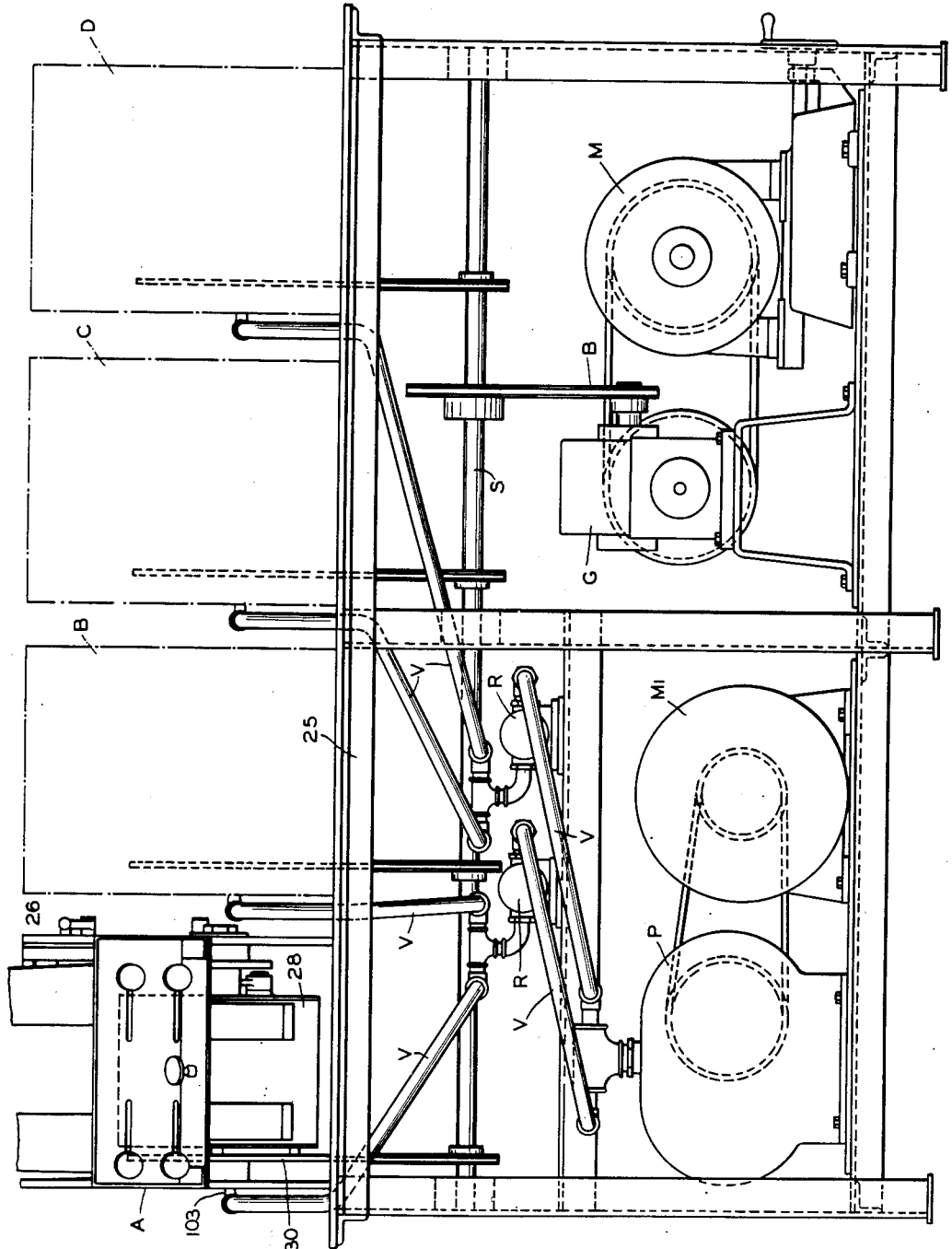
Fig. 1 is a rear elevational view of one embodiment of the present invention.

Referring now to the drawings, and more particularly to Figs. 1, 2, 3 and 12, the card feeding mechanism is fixed on a suitable support such as table 25. In Fig. 1 four complete units, A, B, C and D are carried on the table, but each is identical with the others, and only unit A will be described in detail. All units are driven from a common shaft S by means of a motor M, a change speed gearing G and a belt B. A vacuum pump P is driven by a motor M₁ and each unit has a vacuum conduit connection through piping V as will be obvious from a glance at Fig. 1, without further detailed description. Two solenoid-operated valves R, R are shown, each one controlling vacuum supply to two units.

Each card feeding unit is supported on a pair of side plates 26 fixed in spaced relationship on table 25. In the plates are aligned journals or bearings for a shaft 27 on which a drum 28 is rotatably carried. A gear 29 is fixed to one side of the drum and is rotatable by a belt or chain 30 from shaft S beneath the table.

Figure 2:
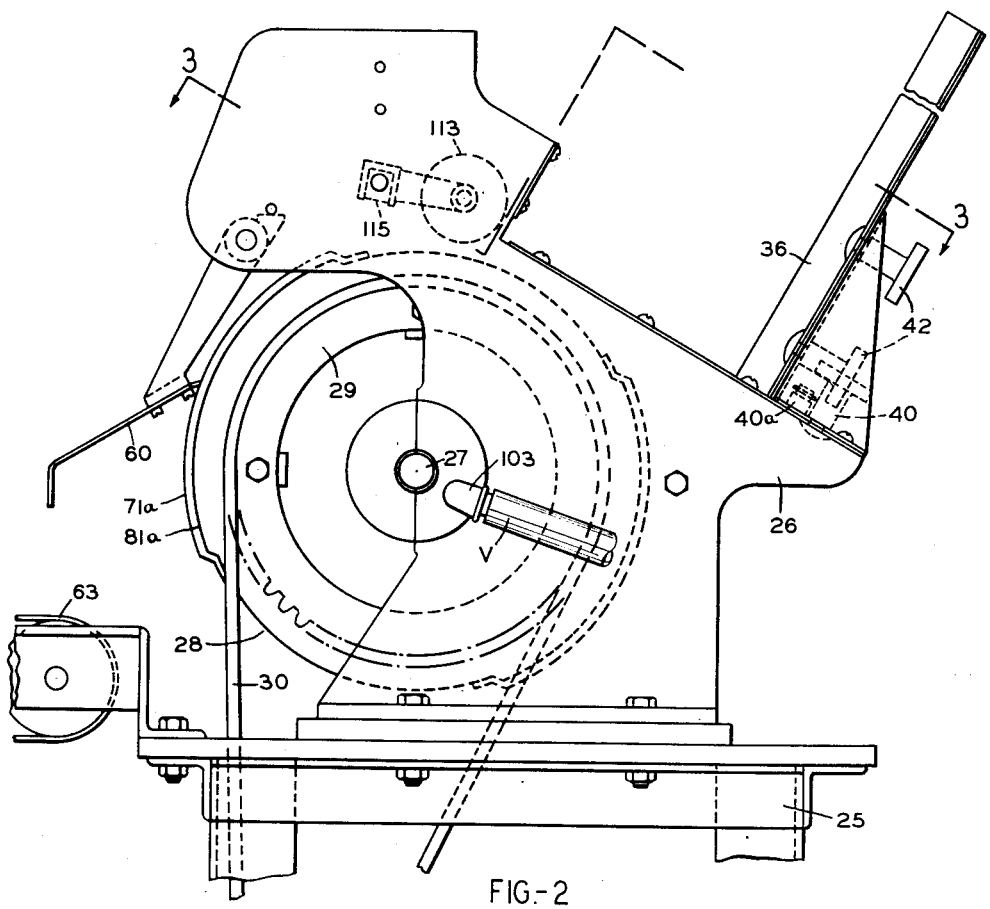
Fig. 2 is a side elevational view of the same.
Figure 13:
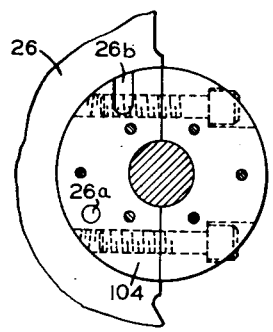
Figure 14:
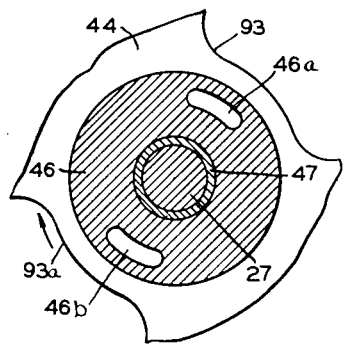
Figure 15:
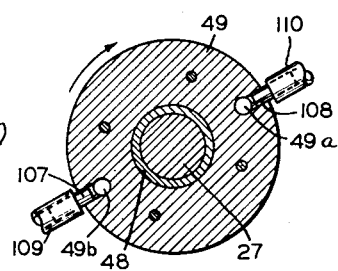
Figure 12:
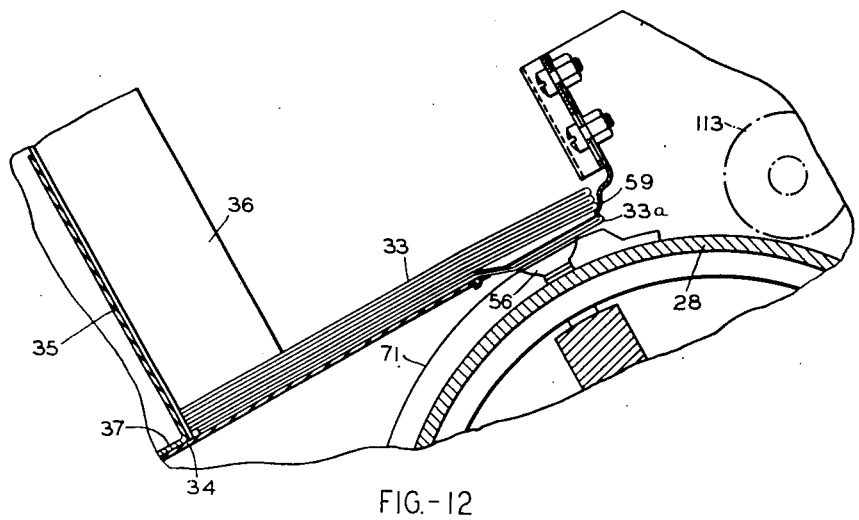

As best seen in Figs. 2 and 12, a stack of sheets or cards 33 is supported on adjustable stack-holding means comprising a floor plate 34, a rear wall 35, and a pair of side guides 36. The stack holder is adjustably fixed on side plates 26, and the floor plate 34 closely overlies the upper peripheral portion of the drum. The rear wall 35, which is somewhat inclined from the vertical to maintain the stack of cards in stable alignment, is movably fixed on the floor plate 34 in the following manner. The lower edge of the rear wall is provided with a flange 37 in contact with the floor plate (Fig. 12) and perforations in the flange are aligned with respective slots 38 in the floor plate. Adjusting bolts 39 pass through the perforations and slots, and manual control is effected by control heads 40 and 40a. Heads 40a are smaller to permit clearance between their tops and the heads 43 soon to be described.

Figure 3:
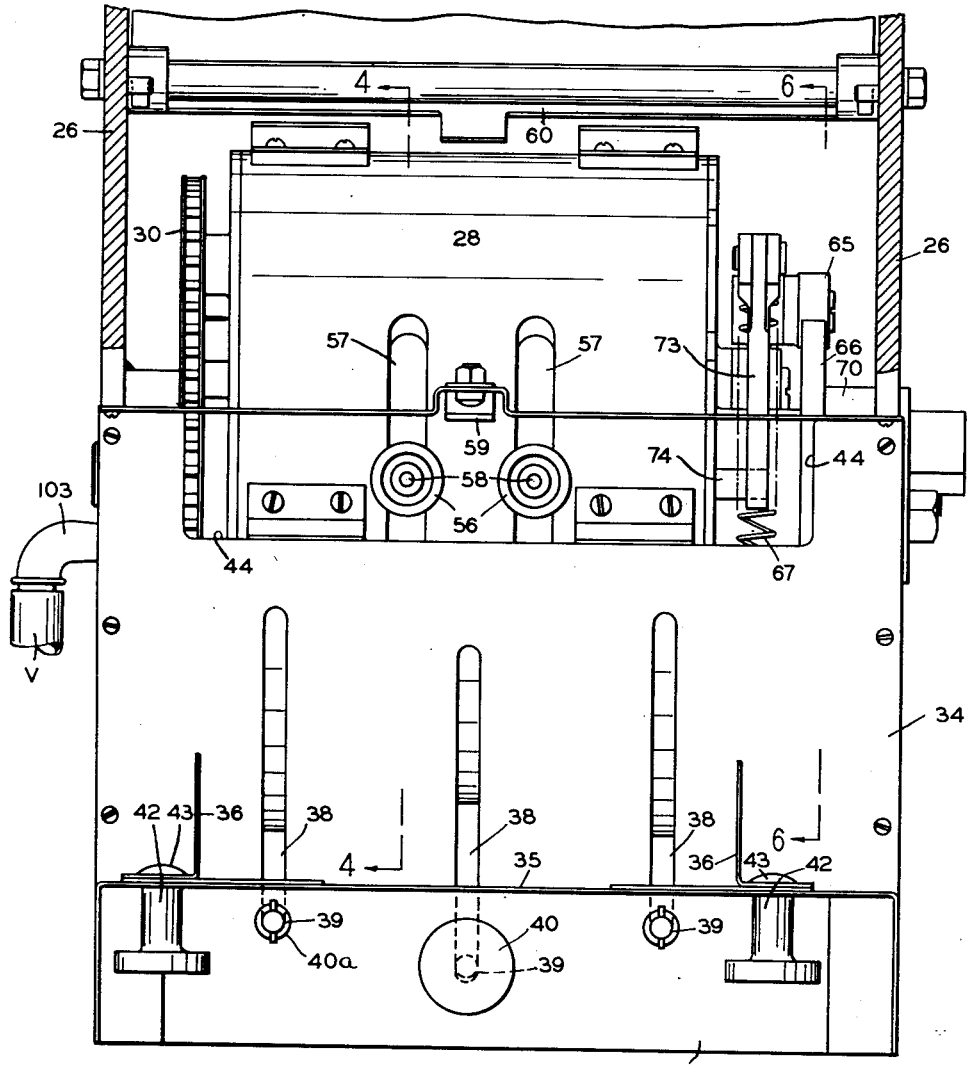
Fig. 3 is a plan view from approximately the line 3—3 of Fig. 2.

The side guides 36 may be adjusted towards and from each other by bolts 42 and heads 43 in similar manner, as best seen in Fig. 3.

The front edge of the floor plate 34 is recessed at 44 (Fig. 3) to permit the card pickup means to have access to the front edge of the lowest card in the stack as will appear.

Drum 28 is hollow, having side walls 44, and a generally cylindrical peripheral wall 45 (Fig. 9). Side walls 44 have centrally located bosses 46 which are bored to receive bearings 47 for relative rotation of the drum on its shaft 27. Also rotatable on bearing sleeves 48 within the drum is a sleeve 49 which carries the card pickup means. Centrally of sleeve 45 is a pair of opposed projections 50, each having an outer cross arm 50a. The arm 50a and the central portion of sleeve 49 are radially bored at 53 and 54 respectively to receive a pair of identical plungers 55 having vacuum cup tips 56. The manner of operation of these card-pickup plungers will be described hereinbelow. It is sufficient for the moment to state that when slots 57 in the peripheral wall 45 of the drum rotate into registry with recess 44 (Fig. 3) in the floor plate 34, plungers 55 are moved outwardly until vacuum cups 56 contact the bottom of the lowest card in the stack. Practically simultaneously the hollow bores 58 in the plungers are placed in direct communication with the vacuum pump so as to secure a firm grip between the cups 56 and the card. The plungers are then retracted to draw the front edge 33a of a card (Fig. 12) downwardly so as to snap it past a retaining spring clip 59. Continued rotary motion of the drum, sleeve, and plunger then slides the card from the bottom of the stack, carrying it clockwise, as shown in Fig. 12, or counterclockwise as shown in Fig. 2. At a suitable point in drum rotational travel, or just above the inclined chute 60 (Fig. 2) the vacuum is cut off, and the card drops on the chute 60 and falls on the endless belt 63. The belt may be controlled so that it stops while a predetermined lot of cards accumulates, after which a conventional counter mechanism advances the belt so that the stack arrives at a position where an operator can conveniently remove the lot for boxing. As previously indicated, the lot may be dropped one by one from the chute into a container, or otherwise as desired.

It is desirable that rotary motion of the plungers be terminated momentarily, while they move radially outwardly into gripping contact with the card. Since it is also desirable that the drum rotate continuously, and at constant speed, differential speed linkage has been provided, whereby the sleeve 49 which carries the plungers, can be operated directly from the drum, but can be accelerated, decelerated, or even stopped momentarily while drum rotation proceeds at a constant rate. This linkage will now be described.

Figure 6:
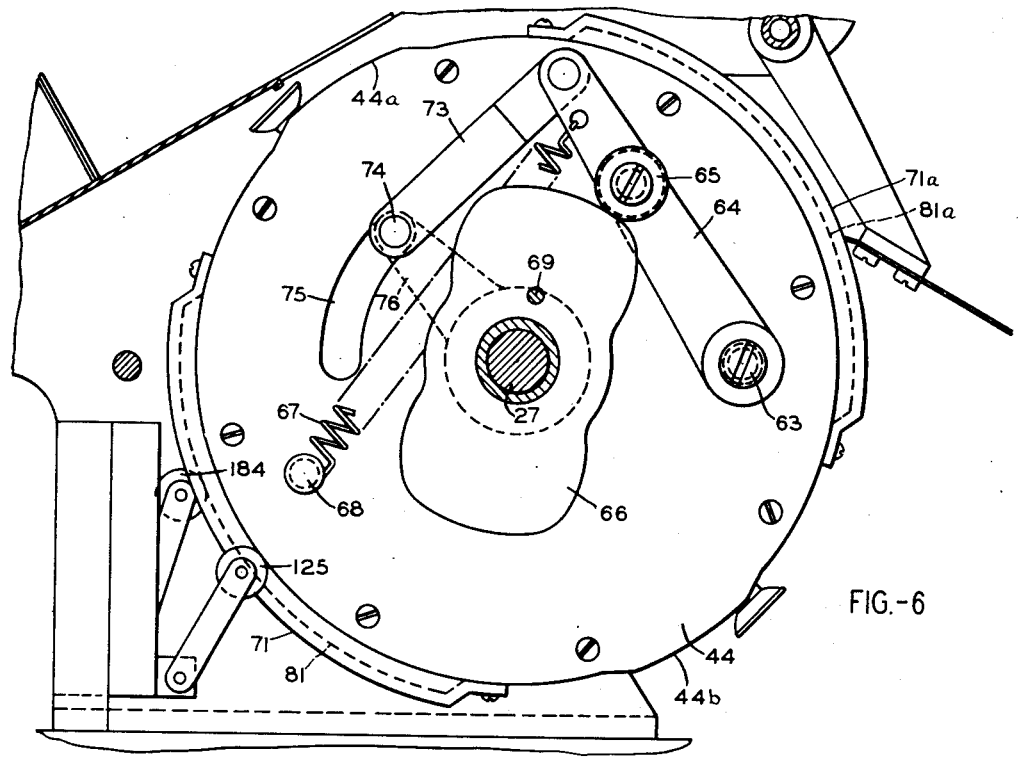
Fig. 6 is a sectional view taken approximately on the line 6—6 of Fig. 3.

Referring more especially to Figs. 3, 6, 7, 8 and 9, the side wall 44 of the drum carries a pivot pin 83, spaced a substantial distance outwardly from the center of rotation. A lever 64 is swingably mounted on pin 63. At an intermediate point on the lever 64 is a cam-following roller 65 adapted to travel on the peripheral cam track of a fixed butterfly cam 66. Lever 64 is biased to maintain constant contact between the cam and roller 65 by means of a tension spring 67 fixed at 68 on the drum wall 44 (Fig. 6). As shown for instance in Figs. 3 and 9, the cam 66 is fixed by pins 69 to a boss 70 which is welded to side plate 26.

A drag link 73 is pivotally carried, at one end, on lever 64, and at its other end it carries a crank pin 74 which extends inwardly, with working clearance, through an arcuate slot 75 in the drum wall 44. From a consideration of Figs. 6, 7, and 8, for example, it will be apparent that as the drum rotates relatively to the fixed cam 66, and roller 65 follows the cam periphery, the crank pin end of the drag link is caused to travel in the slot 75, responsive to cam contour, in a manner soon to be more fully described.

Within the drum the sleeve 49 is provided with a crank arm 76 bored at its tip to receive the inner end of the crank pin 74. By means of the lever 64, drag link 73, crank pin 74 and crank arm 76, a continuous but flexible driving connection is established between the drum and sleeve 49, as will now appear.

Figure 7:
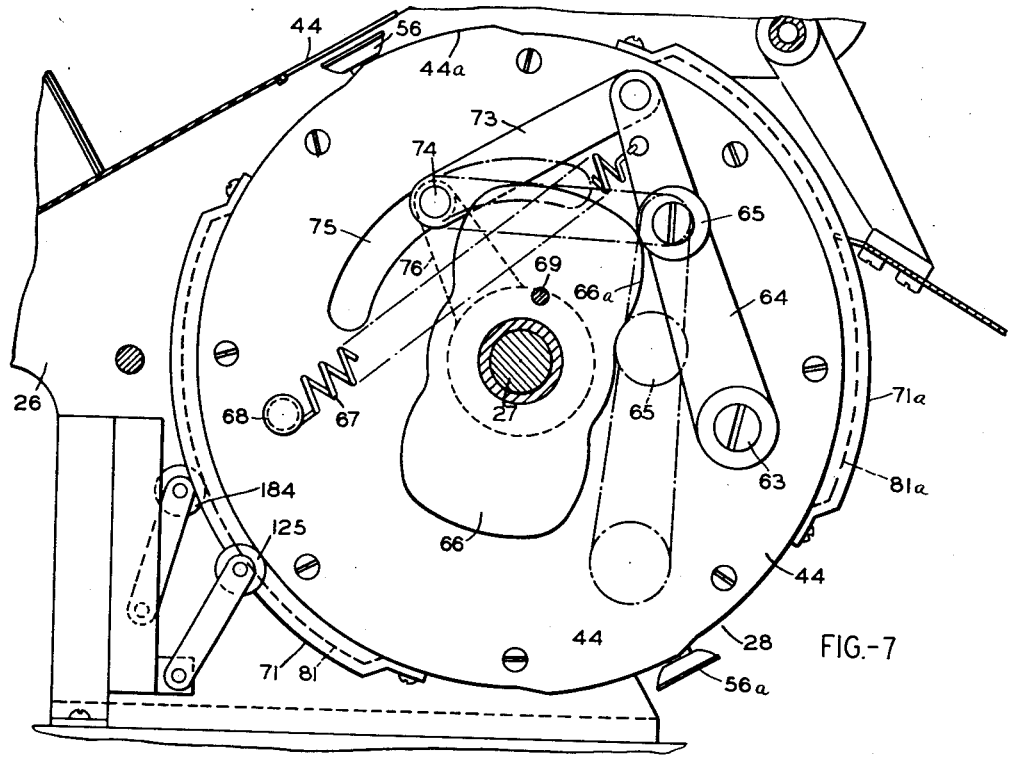
Figs. 7 and 8 are views similar to Fig. 6 but showing some of the parts in a different operating position.
Figure 4:
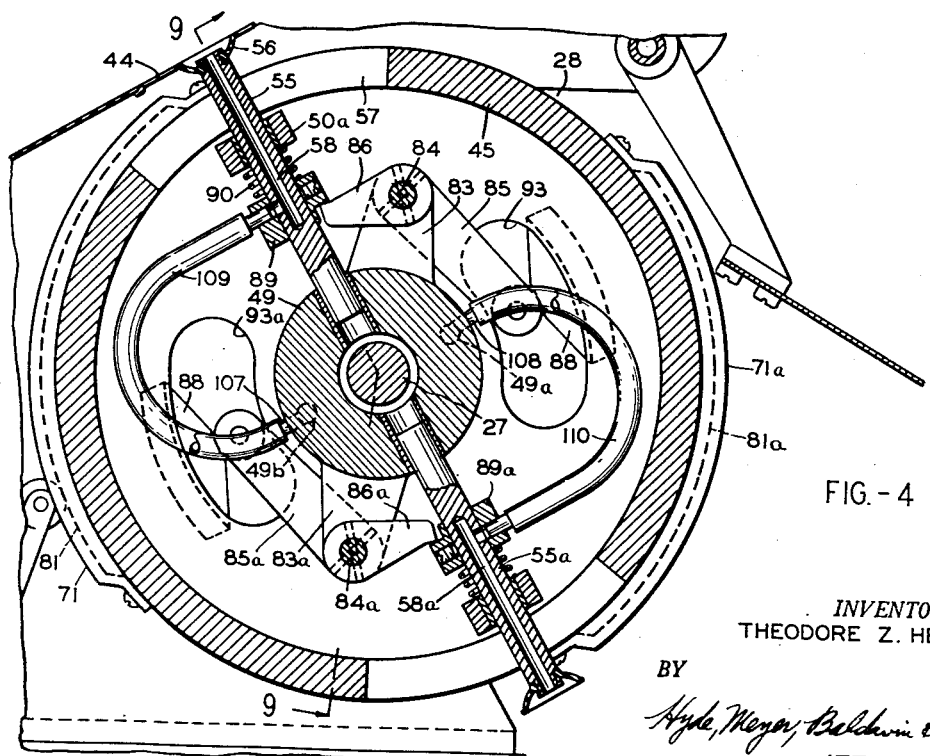
Fig. 4 is a sectional view taken on the line 4—4 of Fig. 3.

Referring first to Fig. 7, the drum is rotating clockwise. Starting with the differential linkage in full line position, it is observed that crank pin 74 is near the leading end of the slot. Further clockwise rotation of the drum causes the roller 65 to travel "downhill" on the portion 66a of the cam track, that is towards the center of rotation of the drum. This of course produces inward swing of lever 64, and moves crank pin 74 rearwardly in the slot, so that while drum and slot are advancing to bring the slot to the dotted line position, and the linkage to the dotted line position, still referring to Fig. 7, the crank pin 74 has maintained the same absolute position with respect to the machine base, although it now occupies the trailing end of the slot.

It will be obvious that by properly designing the peripheral track of cam 66, with relation to differential linkage dimensions and pivot points, counterclockwise movement of the crank pin can exactly compensate for clockwise advance of the drum, so that the crank pin 74 is caused to stop, as just described. In consequence, during this phase of the cycle of rotation the sleeve 49 comes to a stop.

Figure 8:
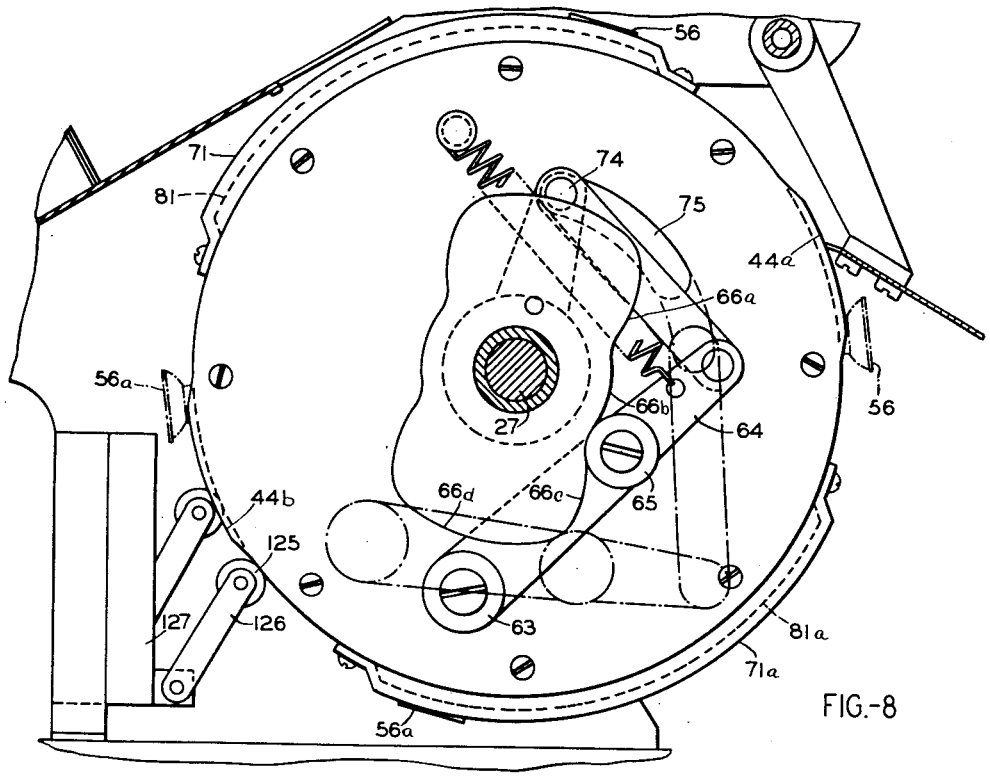

Referring now to Fig. 8, the roller 65 has traveled clockwise over the concentric arcuate portion 66b of the cam track, to the full line position there indicated. It will be apparent that while the roller 65 is traveling in any concentric portion of the cam track, such as 66b or 66d, there is no swinging motion of lever 64, no movement of crank pin 74 in slot 75, and consequently no relative movement of the drum and sleeve 49. The sleeve and drum therefore rotate together, at identical rates, while the roller is traveling concentrically with respect to drum shaft 27.

Again considering Fig. 8, when roller 65 "climbs the hill" on cam track segment 66c, the differential linkage moves to the broken line position, causing the crank pin 74 to move from the trailing end of the slot to the leading end of the slot while at the same time drum rotation of course proceeds. As a result, crank pin advance is added to drum advance, and from what has previously been said it will be apparent that the sleeve 49 will accelerate with respect to the drum.

Correlating the relative motions of the sleeve and the drum, it is observed that while the cam follower 65 travels on segment 66a of the cam, the sleeve stops; on segment 66b sleeve and drum rotate together; on segment 66c the sleeve speeds up to overtake the drum; and on segment 66d sleeve and drum again travel together.

Figure 5:
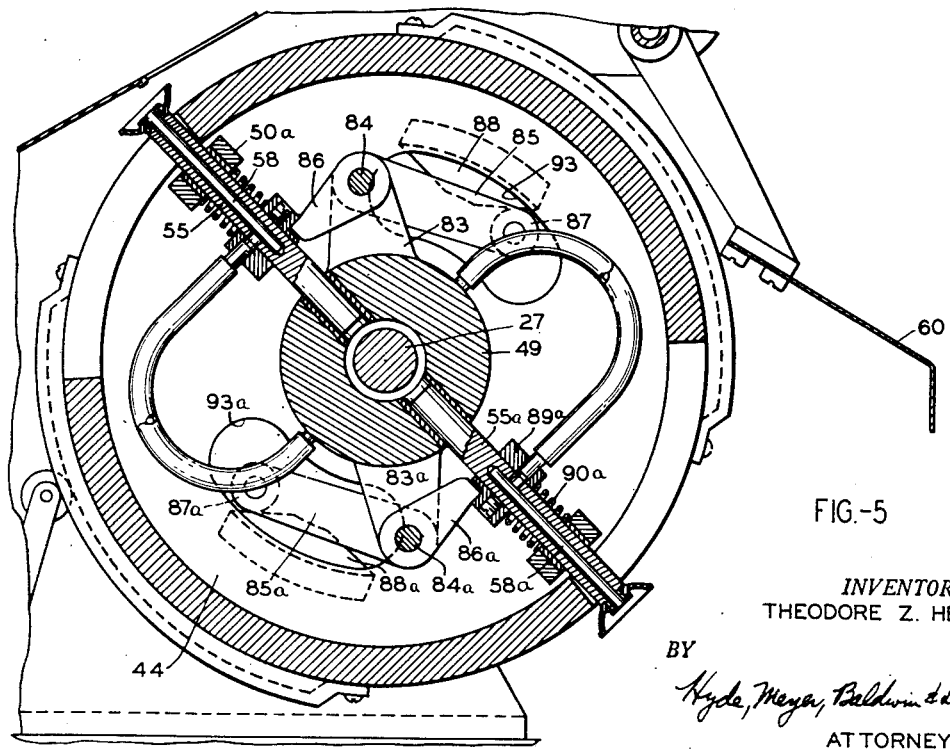
Fig. 5 is a view similar to Fig. 4 but showing some of the parts in a different operating position.

As more clearly apparent from Figs. 5 and 9, the sleeve 49 carries two pairs of plungers, 55 and 55a, the pairs being diametrically opposed. The lower pair (55a in Fig. 5) perform no work in the position shown although they stop, and are advanced and retracted while the upper pair are actually making a pickup. An operation by each pair alternately, or two operations for each drum rotation, results from the fact that there are identical cam sequences on the right and left side of cam 66, so that the differential speed linkage performs two identical cycles in one drum rotation. Two cards are therefore picked up and transferred successively during one drum rotation, one card by plungers 55 and one card by plungers 55a.

The means for radial actuation of the plungers will now be described, with particular reference to Figs. 4, 5, 9, 10 and 11. The plungers 55 will be particularly referred to, since the opposed sets operate identically. The crank arm 76 carried by sleeve 49 has already been identified with respect to its operation in the differential speed linkage. On the other end of sleeve 49 there are two crank arms, 83 and 83a opposed diametrically. The arms 83 and 83a are bored, near their tips, to rotatably carry shafts 84 and 84a respectively. Levers 85 and 85a are pinned to respective shafts 84 and 84a on the ends near the drum wall. Each shaft has a pair of levers 86, 86, and 86a, 86a pinned to the right ends thereof. The two shafts, and the above identified levers, constitute bell crank leverages for plunger operation, and rotary movement of either lever 85 or 85a causes corresponding movement of levers 86 or 86a.

As best seen in Figs. 5, 9, 10 and 11, levers 85 and 85a carry respective rollers 87 and 87a adapted to move back and forth over respective cams 88 and 88a affixed to diametrically opposed points on the inner periphery of drum driving gear 29. Since the sleeve and the drum have limited arcuate motion with respect to each other during drum rotation, as heretofore described, this limited relative motion causes rollers 87 and 87a to move back and forth across the cam so as to produce limited arcuate rotation of the bell crank leverages 84, 85, 86, and 84a, 85a, 86a. The inner levers 86 and 86a abut shouldered projections 89 and 89a fixed on respective plungers 55 and 55a, so as to move the plungers radially outwardly against the bias of springs 90 whenever rollers 87 and 87a cross the rise in cams 88 and 88a. The rollers 87 and 87a project through slots 93 and 93a in the wall 44 of the drum.

The segment 88s of cam 88a (Fig. 10) is concentric with drum rotation, and the plungers 55a remain fully extended only when the roller 87a is on this segment. When the drum and sleeve 49 are traveling together, at the same rotary speed, the roller 87a, is at one or other end of slot 93a in the drum wall, and the plungers 55a are inwardly retracted. When the sleeve 49 stops, as heretofore explained, drum motion advances the cam 88a so that roller 87a is carried across the cam rise, and while on such rise the plungers are moved outwardly momentarily, but the roller moves downwardly again on the opposite slope of the cam and the plungers are retracted by springs 90a. When the sleeve 49 accelerates with respect to the drum the roller 87a again crosses the cam rise, but this portion of roller movement, while again advancing and retracting the plungers, produces no useful work since none of the plungers are in alignment with a card. The operation of roller 87 on cam 88 is similar to that just described for roller 87a and cam 88a.

The means whereby communication is established between suction pump P and the suction cups 56 at the tips of the plungers will now be described.

Piping V (Fig. 1) leads from pump P through an electrically controlled valve R to a nipple 103 in the side plate 26 of the drum support. From the nipple an aperture 26a extends through plate 26, Fig. 11, and through spacer disk 105. Boss 46 of the drum side wall is provided with two diametrically opposed arcuate slots 46a and 46b (Fig. 14) each of which is alternately registrable with aperture 26a during short periods in a complete drum rotation. Sleeve 49 is provided with a pair of elongated openings 49a and 49b bored inwardly and always in registry with the respective slots 46a and 46b, the slots being long enough to permit such registry during the limited differential movement between the drum and the sleeve 49 as hereinbefore described. Branch passages 49c and 49d extend radially outwardly from 49a and 49b respectively to two diametrically opposed pairs of nipples 107 and 108 which, through flexible tubing 109 and 110, are in individual communication with the hollow bores of the plungers.

It will be apparent that when drum rotation brings either slot 46a or 46b into registry with aperture 26a, communication is established from nipple 103 to the plunger bores, and consequently to the suction cups at the plunger tips. This communication occurs twice in each complete drum rotation, by reason of the fact that there are two arcuate slots 46a and 46b. Passage 26a in such position that vacuum is applied only to the upper plungers, and the positions of the plungers is easily timed with respect to the suction application, since sleeve position controls both factors.

Briefly reviewing a cycle of operation, involving 180 degrees of drum travel and one card transfer by one pair of plungers, as an upper pair of plungers 55 (Fig. 5) approaches working position immediately beneath a stack of cards, the speed differential linkage 64, 73, 76 causes the sleeve 49 and plungers 55 and 55a to come to a stop. At the same time the plunger advance means 83, 85, 88 advances the plungers 55 to produce vacuum cup contact with the bottom card. Simultaneously continued rotation of the drum registers arcuate slot 46b between passages 26a and 49b to produce suction at the cups on plungers 55. The plungers are immediately retracted, plungers 55 carrying a card and plungers 55a being idle. Sleeve and drum now rotate together through a predetermined arc, vacuum communication being maintained with plungers 55, while at the same time roller 65 is on cam track segment 66b (Fig. 8) as previously described. When the card is carried to a point where its leading edge is over chute 60 (Fig. 2) the differential speed linkage causes the sleeve to accelerate, moving arcuate slot 46b out of registry with the vacuum passages on both sides thereof, suction is cut off, the suction cup end of the system is vented to atmosphere as will immediately be explained, and the card slides down the chute.

As arcuate slot 46b advances out of registry with passage 26a, and while still aligned with passage 49b (because sleeve and drum are temporarily rotating together) the slot 46b reaches registry with a vent aperture 26b (Fig. 20) in bearing ring 104. This vents the working end of the vacuum passages to atmosphere, and relieves the suction effect at cups 56.

Detector means has been provided for detecting the transfer of more or less than the proper number of sheets or cards, usually meaning two cards, or no card at all, in an embodiment set up to transfer one card at a time. This detector means is best seen in Figs. 1, 2, 16, 17, 18 and 19, and it comprises a feeler normally biased to contact with the drum periphery, and disposed in the path of card transfer so as to be intercepted by each card between the card pickup and delivery zones. In the present embodiment it consists of a wheel 113 rotatably carried on arm 114 the arm being adjustably fixed on a transverse shaft 115 journaled at its ends in side plates 26. The central portion of the shaft is rectangular, and the arm 114 has a claw portion 114a which grasps the shaft, and may be fixed at any transverse point on the shaft by set screw 116.

A pair of spaced microswitches 117, 118 are fixed on side plate 26, in spaced relationship, and somewhat above the shaft, with their control buttons inturned. A rockable lever 119 is freely carried on the rounded end 115a of shaft 115, the upper end of the lever extending between the microswitch buttons. The lower end of the lever has a biasing spring attached thereto, the other end of the spring abutting a bracket 120 on wall 26. The natural tendency of the spring is to bias lever 119 against the push button of switch 118. Since the purpose of wheel 113 is to "feel" the thickness of each card being transferred, some adjustable linkage must be set up between the feeler wheel 113 and the lever 119 by means of which the lever 119 is exactly between the microswitches when wheel 113 is separated from the drum by a card of desired thickness. It is intended of course that variation of the wheel in either direction must operate either microswitch 117 or 118, either such operation stopping the driving motor until an operator can determine what caused the thickness variation, and can correct the defect.

The adjustable linkage comprises a bifurcated yoke member 123 fixed by set screw 123a to the outer end of shaft 115. Lever 119 has a tab 119a extending outwardly through an aperture 124 in wall 26, and terminating between the legs of yoke 123. Each such leg carries an adjusting screw 121. When a new lot of cards or sheets is to be handled, one such card is placed beneath the wheel 113. This raises the wheel to proper operating position. Raising of the wheel turns shaft 115 by means of arm 114 and clamp 114a. This turns yoke 123, and, through tab 119a has a tendency to force the top of lever 119 against one or other of the microswitch operating buttons, if the card thickness has changed since the preceding lot. In such case the adjusting screws 121 are manipulated properly to bring lever 119 back to center between the microswitches.

The microswitches are thrown into a motor-controlling circuit (by means to be described hereinafter) only when a card should be under the wheel as a result of the cycle of operations previously disclosed. After the card has passed the wheel, it drops to produce a contact between the top of lever 119 (Fig. 16) and switch 118, but the microswitch circuit is inactive until the next card is due under the wheel 113.

The side wall 44 of the drum, the one at the right of Fig. 9, is provided with two cam projections 44a, 44b, as better shown in Fig. 8. A cam-following roll 125, is carried on a switch-operating arm 126 of switch 127, which is fixed with respect to the table top. As the drum rotates, arm 126 swings through a short arc responsive to movement of the cam follower 125 on cams 44a and 44b. The cam position is such, with relation to the other operating elements carried by the drum or responsive to drum rotation, that a card is passing under feeler wheel 113 while cam follower 125 is on either cam 44ᵃ or cam 44ᵇ. This puts switch 127 in synchronism with the microswitches 117 and 118 already described. The significance of this synchronization will be described in connection with the wiring diagram.

A pair of opposed cams 81, 81a are carried on the cylindrical periphery of the drum (Figs. 5 to 7). They cooperate with a cam-following roller 184 which is operatively connected to a switch armature 133, as best shown in schematic form on the wiring diagram, Fig. 21. As will appear in connection with the description of the electric circuits, switch armature 133 functions in a circuit which permits the machine to be started, even though no card is under feeler roll 113 while the roll is in the card measuring portion of the rotational cycle.

A conventional counter device is schematically indicated within the broken line box S at the lower right hand corner of the wiring diagram, Fig. 21. It functions to advance the conveyor belt after a predetermined lot of cards is transferred by the apparatus. Two solenoid coils 167 and 171 are shown in connection therewith whose purpose will later appear.

The wiring diagram shows seven manual control buttons spring biased to a rest position which in each case is either open or closed as will appear. Their respective functions will be briefly noted here, and will be more fully detailed later. Button 130 is normally open, and, when depressed, it energizes a starting circuit for vacuum pump motor M₁. Button 131 is likewise normally open, and, when depressed, it energizes a starting circuit for the drum driving motor M. Button 132 is normally open, and functions in a circuit which energizes solenoid valve R in the vacuum system. Button 135 is normally closed, and is in a maintaining circuit for the vacuum pump motor. When it is opened all operating circuits are broken. Button 136 is normally closed, and is in a maintaining circuit for driving motor M, so that when this button is depressed, motor M alone stops. Button 137 is normally closed, and, when depressed, it breaks a specific circuit to the solenoid valve R. Button 138 is normally closed, and functions in a circuit for resetting the controls after a "trouble" stop.

A complete cycle of operations will now be described, with reference practically exclusively to Fig. 21.

In starting the apparatus it is first necessary to build up an adequate vacuum effective, by negative pressure, at the suction cups hereinabove described. It is therefore desirable to first start the vacuum pump motor M₁. Button 130 is depressed, energizing the following starting circuit; from line L₁ (of a three phase motor drive supply) through conductors 140 and 141, button 130 in manually depressed position, normally closed button 135, conductor 142, relay coil 143, conductors 144 and 145 to L₂. Energization of relay 143 swings its ganged armatures 143a, 143b, 143c, and 143d clockwise, and a maintaining circuit for motor M₁ is immediately set up, so that button 130 may be released.

The vacuum motor maintaining circuit is as follows; from L₁ through conductors 140 and 141, armature 143d in closed position, conductors 146 and 147, normally closed button 135, conductor 142, relay coil 143, conductors 144 and 145 to L₂. The motor M₁ is of course energized from lines L₁, L₂, and L₃ through armatures 143c, 143a and 143b respectively. This motor will continue to run until the maintaining circuit is deliberately broken by depression of button 135 so as to de-energize relay coil 143.

The next step in the operational cycle is to start the driving motor M which runs the card transfer drum. By pushing normally open button 131 the following starting circuit is established; from L₁ through conductors 140 and 141, armature 143d in closed position, conductors 146, 148, 149, 150, 151 and 152, depressed button 131, normally closed button 136, conductor 153, normally closed armature 154a of relay 154, conductor 155, relay coil 156, conductor 157 to L₂.

Energization of relay coil 156, by the circuit just described, establishes the following maintaining circuit, permitting manual release of button 131; from L₁, through conductors 140 and 141, relay armature 143d in closed position, conductors 146, 148, 149, 150, 151, 152 and 158, armature 156a in closed position, conductor 159, normally closed button 136, conductor 153, normally closed armature 154a, conductor 155, relay coil 156, and conductor 157 to L₂. The motor M is energized from lines L₁, L₂, and L₃ through armatures 156b, 156d and 156c respectively, but may be stopped by depressing normally closed button 136. As will appear, it may also be stopped by energization of relay 154 as a result of subsequent operating trouble.

Solenoid valve R (Fig. 1) is responsive to solenoid 134 (Fig. 21) and is opened by depression of button 132, effective on the following circuit; from L₁, through conductors 140 and 141, armature 143d in closed position, conductors 146, 148 and 160, depressed button 132, conductor 161, relay coil 162 and conductors 163, 164, 165 and 145 to L₂. Energization of relay coil 162 by the circuit just described establishes a solenoid valve maintaining circuit as follows; from L₁ through conductors 140 and 141 armature 143d in closed position, conductors 146, 148 and 160, normally closed button 137, conductor 166, armature 162a in closed position, relay coil 162, conductors 163, 164, 165 and 145 to L₂.

The energization of relay coil 162, and maintenance thereof in this condition, holds ganged armature 162b in closed position. Armature 162b, as will appear, is in circuit with a switch 133 responsive to roller 184 on cam 71. This circuit is ultimately effective upon counter mechanism S, and also on solenoid valve R, through the following circuit elements; from L₁ through conductors 140 and 141, armature 143d in closed position, conductors 146, 148, 149 and 169, armature 162b in closed position, conductors 170 and 171, switch armature 133 (closed when roller 184 is on cam 81), conductor 195 relay coil 172, conductors 196, 165 and 145 to L₂. A circuit is also established from conductor 171, conductors 197, 198, armature 172c (now closed), conductor 173, counter clutch coil 167 (which operates the counter mechanism and also closes switch arm 168), conductors 174, 164, 165 and 145 to L₂.

Energization of coil 167 by the circuit just described closes switch arm 168 and establishes a circuit through solenoid 134 which operates to open vacuum valve R, this circuit proceeding as follows; from L₁ through conductors 140, 141, armature 143d in closed position, conductors 146, 148, 149 and 169, armature 162b in closed position, conductors 170 and 175, switch 168 (now closed), solenoid 134, conductors 176, 174, 164, 165 and 145 to L₂. Upon establishment of this circuit, the vacuum valve R is opened, and all operating elements are ready to transfer cards.

If, now, drum 28 rotates to the point where a card X of the proper width is carried by the suction cups to a measuring position beneath the feeler wheel, as indicated in Fig. 21, arms 117a and 118a of the respective microswitches 117 and 118 maintain the full line position shown in Fig. 21. There is however a circuit established to coil 177 of the counter device, as follows; from L₁ through conductors 140 and 141, armature 143d in closed position, conductors 146, 148, 149, 150, 178 and 179, arm of switch 127 in closed position (roller 125 being on cam 44a, in synchronism with feeler cam 71), conductor 180, arm 172a (now in closed position), conductor 181, switch arm 118a in full line position, conductor 182, switch arm 117a in full line position, conductor 183, counter coil 177, conductors 174, 164, 165 and 145 to L₂. This circuit energizes the counter mechanism so as to register the passage of a proper card.

When in normal running operation, as so far described, and for some reason, no card is advanced to beneath the feeler wheel at the proper moment in the cycle, the driving motor will be stopped by interruption of its maintaining circuit at armature 154a by energization of relay 154, as follows; from L₁ through conductors 140 and 141, armature 143d, conductors 146, 148, 149, 150, 178 and 179, switch arm 127 (closed by cam 44a) conductor 180, armature 172a in closed position, conductor 181, switch arm 118a (in dotted line position because of absence of card beneath wheel) conductors 185, 186 and 187, relay coil 154, conductors 188, 165 and 145 to L₂. Energization of relay 154 swings its ganged armatures 154a, 154b and 154c clockwise, breaking the maintaining circuit to the driving motor M which circuit went through normally closed armature 154a as previously described.

Stoppage of the driving motor is also accompanied by the lighting of a warning light 190 (or the energization of some such perceptible signal) through the following circuit; from L₁ through conductors 140 and 141, armature 143d in closed position, conductors 146, 148, 149, 150, 178 and 189, light 190, conductor 191, armature 154c now closed, conductors 188, 165 and 145 to L₂. A maintaining circuit is desirable for this light, since otherwise, in stopping, the drum might coast past the feeler wheel measuring position with respect to cam 71, thereby restoring switch arms 117a and 118a to inactive position, de-energizing relay coil 154 and breaking the circuit to the light 190. The maintaining circuit for the warning light is as follows; from L₁ through conductors 140 and 141, armature 143d in closed position, conductors 146, 148, 149, 150, and 151, normally closed button 138, conductor 192, armature 154b (still closed) conductors 193 and 187, relay coil 154, conductors 188, 165 and 145 to L₂. Maintenance of the relay coil in energized condition maintains the warning signal in lighted condition and the driving motor cannot be started until the undesirable condition is corrected, and button 138 is depressed to break the last described maintaining circuit.

When more than one card, or a card of unusual thickness comes under feeler wheel 113, the machine is stopped in a manner similar to that already described for the situation where no card is delivered, except that while armature 118a maintains its full line position, armature 117a moves to its dotted line position. As will be clear from the circuits outlined in the last preceding paragraph, the maintaining circuit is broken as before except that energization of relay 154 now proceeds through switch arm 118a, conductor 182, switch 117a in dotted line position and conductor 194 to relay 154.

One more protective feature may be explained here. It has already been pointed out that during two brief angular increments of one complete drum rotation the wheel 113 cooperates with cam 71, and the roller 125 at the same time cooperates with either cam 44a or 44b to affect electrical circuits effective upon the driving motor, and unless a card (of proper thickness) is interposed between wheel 113 and cam 71 at this brief instant the driving motor will stop by breakage of its maintaining circuit at armature 154a. This is accomplished of course by energization of relay 154 through the switching arrangement 117a—118a already described.

It is to be expected however that in closing a series of operations, or after a shutdown for any reason, the drum has coasted to a stop with the feeler wheel 113 in approximately the position shown in Fig. 21, within the electrical measuring zone, but there is no card underneath it when button 131 is depressed to initiate the next series of operations. The motor M cannot start because arm 118a in dotted position energizes relay 154 and arm 154a is in open position. The drum of course could be cranked manually past the measuring position, whereupon the feeler wheel would no longer be in the motor-stopping circuit. This expedient however is impractical when, as is usual, a plurality of drums are ganged for simultaneous operation, though not in exact cyclic synchronism.

To cope with this situation additional circuit means has been provided to temporarily prevent the energization of relay 154 which, if energized, is the prime factor in breaking the starting circuit. This means comprises roller 184 with its linked switch arm 133. Roller 184 is so positioned with respect to the drum periphery and cam 81, that in the cyclic period when the suction plungers are supposed to be withdrawing a card from the stack and presenting it to wheel 113, the roller 184 is just dropping off the trailing end of cam 81 and is thereby opening arm 133. This breaks the energizing circuit to relay 172, and its armatures 172a, 172b and 172c fall clockwise. Since the energizing circuit to relay 154 (through switch arm 118a in dotted position) passed through armature 172a, relay 154 cannot at this moment be energized, so that its armature 154a remains in motor starting position, and drum rotation proceeds, but a card will not be picked up until after button 132 is depressed.

When button 132 is depressed to open the vacuum solenoid valve R by energization of solenoid 134 as heretofore explained, a circuit is established to permit normal operation of the feeler wheel effect upon motor M, as follows: from L₁ through conductors 140 and 141, armature 143d, conductors 146, 148, 149 and 169, armature 162b in closed position, conductors 170 and 171, arm 133 (closed when either cam 81a or 81 next intercept roller 184, conductor 195, relay coil 172, conductors 196, 165 and 145 to L₂. This energizes coil 172 simultaneously with the opening of the solenoid valve by coil 134 (previously explained). When coil 172 is energized it closes armature 172a which, as previously noted is in circuit with the measuring microswitch arms 117a and 118a, and this permits the next card measuring operation to be performed.

From what has been said it will be apparent that at the first moment of starting of the apparatus, if feeler wheel is in measuring position, but there is no card beneath it, the drive motor M will not stop, but at any subsequent measuring point in the cycle, if no card (or an improper number of cards) intercepts the wheel, the motor M will stop.

What I claim is:

1. Card transfer mechanism for transferring a card from a receiving point to a delivery point comprising means for supporting a stack of cards at said receiving point, a drum having its peripheral wall adjacent said card supporting means, means for rotating said drum, a rotatable sleeve within said drum, the peripheral wall of said drum having an aperture therethrough, card pickup means carried by said sleeve and rotatable therewith, means operatively connecting said sleeve and said drum and effective to cause rotary movement of said sleeve, momentary interruption of said rotary movement, and then resumption of said rotary movement, means effective upon momentary interruption of rotary movement of said sleeve to cause a portion of said card pickup means to move outwardly through the peripheral wall aperture of said drum for contact with a card on said card supporting means, and means for temporarily retaining such contacted card on said card pickup means, to thereby enable such card to be transferred to said delivery point upon resumption of rotary movement of said sleeve.

2. Card transfer mechanism as defined in claim 1, characterized in that the rotary movement of said sleeve is at variable rates of speed relative to the speed of rotation of said drum.

3. Card transfer mechanism for transferring a card from a receiving point to a delivery point comprising means for supporting a stack of cards, a drum having its periphery adjacent said card supporting means, driving means for rotating said drum at a uniform rate of speed, a rotatable sleeve within said drum, differential speed mechanism operatively connected to said drum and to said sleeve whereby rotation of said sleeve is responsive to rotation of said drum, but whereby said sleeve is caused to come to a momentary stop during a fractional portion of a complete rotation, card pickup means carried by said sleeve, the peripheral wall of said drum having an aperture therethrough, and said pickup means having a portion extendable outwardly through said aperture and alignable with said card supporting means during said momentary stop, the said card pickup means comprising a plunger having a suction cup thereon in communication with a source of vacuum, means for moving said plunger outwardly during said momentary stop to cause said cup to contact a card including a lever pivotally carried by said sleeve and a cam fixedly carried by said drum, said lever having a portion in operative contact with said cam and another portion operatively engaging said plunger, said cam having a cam track portion eccentric with respect to the axis of rotation of said drum, means for establishing communication between said suction cup and said source of vacuum whereby to retain a card, contacted as aforesaid, on said cup, means for withdrawing said plunger inwardly to remove said card from the card supply, and means for interrupting communication between said suction cup and said source of vacuum when said plunger is moved into alignment with the card delivery point.

4. Card transfer mechanism as defined in claim 3 wherein the differential speed mechanism operatively connected to said drum and said sleeve comprises a butterfly cam fixed on the shaft and having a peripheral continuous cam track having portions concentric with the axis of drum and sleeve rotation and other portions eccentric to the said axis, a lever pivoted on an end wall of said drum adjacent said cam, a link pivotally connected at one end to the free end of said lever, and at another end to said sleeve, a cam follower fixed to said lever at a point spaced from its pivotal connection to said link, whereby, upon rotation of said drum said cam follower rides on said cam track and exerts upon said sleeve a driving torque which is constant when the cam follower is on the concentric portions of the cam track, but which accelerates or decelerates the sleeve when the follower is on the eccentric portions of the cam track.

5. Card transfer mechanism as defined in claim 4, characterized in that the said card pickup means is in the form of a reciprocable plunger.

6. Card transfer mechanism as defined in claim 1, characterized in that said card pickup means is in the form of a reciprocable plunger and characterized further in that the rotary movement of said sleeve is momentarily interrupted when the peripheral wall aperture of the drum is in alignment with the longitudinal axis of the reciprocable card pickup means.

7. Card transfer mechanism for transferring a card from a receiving point to a delivery point comprising means for supporting a stack of cards at said receiving point, a drum having its peripheral wall adjacent said card supporting means, means for rotating said drum, a rotatable sleeve within said drum, the peripheral wall of said drum having an aperture therethrough, the aperture being elongated in a plane transverse to the longitudinal axis of the drum, card pickup means in the form of a reciprocable plunger carried by said sleeve and rotatable therewith, means operatively connecting said sleeve and said drum and effective to cause rotary movement of said sleeve, momentary interruption of said rotary movement, and then resumption of said rotary movement, the rotary movement of the sleeve, when resumed, being at an increased rate of speed, and the momentary interruption of the sleeve occurring when the heading end of the elongated aperture in the peripheral wall of the drum is in alignment with the longitudinal axis of the reciprocable card pickup plunger, means effective upon momentary interruption of rotary movement of said sleeve to cause a portion of said card pickup means to move outwardly through the peripheral wall aperture of said drum for contact with a card on said card supporting means, and means for temporarily retaining such contacted card on said card pickup means, to thereby enable such card to be transferred to said delivery point upon resumption of rotary movement of said sleeve.

THEODORE Z. HERR.

REFERENCES CITED

The following references are of record in the file of this patent:

UNITED STATES PATENTS

| Number | Name | Date |
|---|---|---|
| 1,580,671 | Nichols | Apr. 13, 1926 |
| 1,775,677 | Huckins | Sept. 16, 1930 |
| 2,195,545 | Stobb | Apr. 2, 1940 |
| 2,318,132 | Welk | May 4, 1943 |
| 2,393,614 | Curtis | Jan. 29, 1946 |